United States Patent
Tooker et al.

(10) Patent No.: US 12,103,366 B2
(45) Date of Patent: Oct. 1, 2024

(54) VEHICULAR LIFTGATE WINDOW ASSEMBLY WITH HEATER GRID ELECTRICAL CONNECTION THROUGH GLASS WINDOW PANEL

(71) Applicant: Magna Mirrors of America, Inc., Holland, MI (US)

(72) Inventors: Troy F. Tooker, Holland, MI (US); David L Guillozet, Hamilton, MI (US); Ashley D. Step, Zeeland, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 673 days.

(21) Appl. No.: 17/301,299

(22) Filed: Mar. 31, 2021

(65) Prior Publication Data

US 2021/0300159 A1 Sep. 30, 2021

Related U.S. Application Data

(60) Provisional application No. 63/002,496, filed on Mar. 31, 2020.

(51) Int. Cl.
*B60J 1/18* (2006.01)
*H05B 3/84* (2006.01)
(52) U.S. Cl.
CPC ............. *B60J 1/1884* (2013.01); *H05B 3/84* (2013.01); *H05B 2203/011* (2013.01); *H05B 2203/016* (2013.01)
(58) Field of Classification Search
CPC .... B60J 1/1884; H05B 3/84; H05B 2203/011; H05B 2203/016

USPC .......................... 219/491, 503, 203, 215, 209
See application file for complete search history.

(56) References Cited

U.S. PATENT DOCUMENTS

| | | | |
|---|---|---|---|
| 5,551,197 A | 9/1996 | Repp et al. | |
| 5,694,812 A * | 12/1997 | Maue | H02K 7/1166 |
| | | | 15/250.01 |
| 5,853,895 A | 12/1998 | Lewno | |
| 7,184,190 B2 | 2/2007 | McCabe et al. | |
| 7,255,451 B2 | 8/2007 | McCabe et al. | |
| 7,274,501 B2 | 9/2007 | McCabe et al. | |
| 8,402,695 B2 | 3/2013 | Smith et al. | |
| 8,881,458 B2 | 11/2014 | Snider et al. | |
| 9,579,955 B2 | 2/2017 | Snider | |
| 10,501,008 B2 | 12/2019 | Snider | |

(Continued)

*Primary Examiner* — Eric S Stapleton
*Assistant Examiner* — Yeong Juen Thong
(74) *Attorney, Agent, or Firm* — HONIGMAN LLP

(57) ABSTRACT

A vehicular rear liftgate window assembly includes a glass window panel configured to be pivotable between a closed position and an opened position. A heater grid is disposed at an interior side of the glass window panel, the heater grid including a plurality of electrically conductive traces. A pair of busbars are established at the interior side of the glass window panel at opposite side regions of the electrically conductive traces of the heater grid. An aperture is established through the glass window panel at or near an upper region of each busbar, and electrical connectors are electrically connected at the upper regions of the busbars. The electrical connectors are configured to route a respective electrical wire from an exterior side of the glass window panel and through the respective aperture for electrical connection to the respective busbar at the interior side of the glass window panel.

18 Claims, 4 Drawing Sheets

(56) References Cited

U.S. PATENT DOCUMENTS

| | | |
|---|---|---|
| 10,524,313 B2 | 12/2019 | Snider et al. |
| 10,843,644 B2 | 11/2020 | Snider et al. |
| 11,246,189 B2 | 2/2022 | Douma |
| 2009/0277671 A1* | 11/2009 | Hahn .................... H01R 4/023 228/136 |
| 2013/0125975 A1* | 5/2013 | Malik, Jr. ............... H02S 40/34 174/541 |
| 2018/0079379 A1* | 3/2018 | Snider ...................... H05B 3/03 |
| 2018/0176996 A1* | 6/2018 | Ichida ............... B32B 17/10385 |
| 2020/0205238 A1* | 6/2020 | Brooks ................ B32B 27/365 |
| 2022/0295603 A1 | 9/2022 | Snider et al. |

\* cited by examiner

VEHICULAR LIFTGATE WINDOW ASSEMBLY WITH HEATER GRID ELECTRICAL CONNECTION THROUGH GLASS WINDOW PANEL

CROSS REFERENCE TO RELATED APPLICATION

The present application claims the filing benefits of U.S. provisional application Ser. No. 63/002,496, filed Mar. 31, 2020, which is hereby incorporated herein by reference in its entirety.

FIELD OF THE INVENTION

The present invention relates to a rear window assembly for a vehicle and, more particularly, a rear liftgate window assembly for a SUV or crossover vehicle or station wagon or the like.

BACKGROUND OF THE INVENTION

It is known to provide a rear liftgate window assembly for a rear opening of a vehicle. Such liftgate window assemblies are pivotable between a closed state and an opened state. The glass window panel of the liftgate often has a heater grid established thereat, with electrical wire connections made to the heater grid at the window panel inside the vehicle, which sometimes results in the connectors and wiring being visible to a person viewing the window from inside the vehicle when the liftgate is closed.

SUMMARY OF THE INVENTION

The present invention provides a rear liftgate window assembly that includes a heater grid with two electrical connectors that electrically connect from outside the liftgate window panel to heater grid connectors or buttons at the inner side of the liftgate window panel through respective holes in the glass panel. The wiring is thus routed to a vehicle wire harness at the applique or spoiler above the window so the wiring is routed from the applique along and within the exterior cover element, through the hole in the glass and into the interior cover element, where electrical connection to the heater grid busbar is made. The wire connector is thus hidden from view at either the interior or exterior side of the window panel.

These and other objects, advantages, purposes and features of the present invention will become apparent upon review of the following specification in conjunction with the drawings.

DESCRIPTION OF THE PREFERRED EMBODIMENTS

Figure 1:
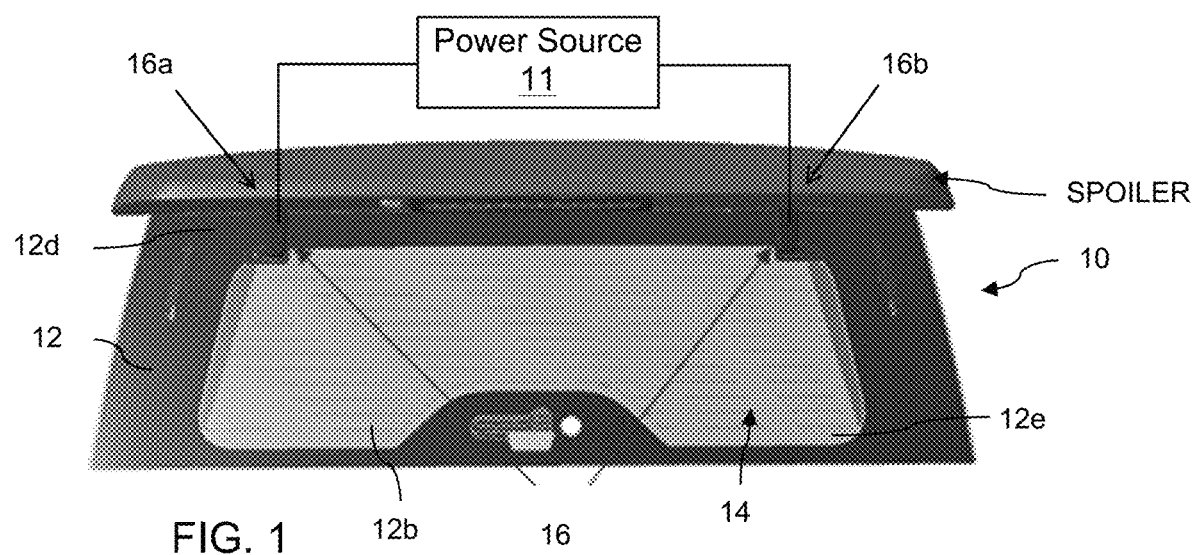
FIG. 1 is a rear view of a rear liftgate window assembly for use at a rear of the vehicle, with the rear liftgate window assembly having a heater grid and an electrical connector at the exterior of the rear liftgate window assembly.
Figure 2:
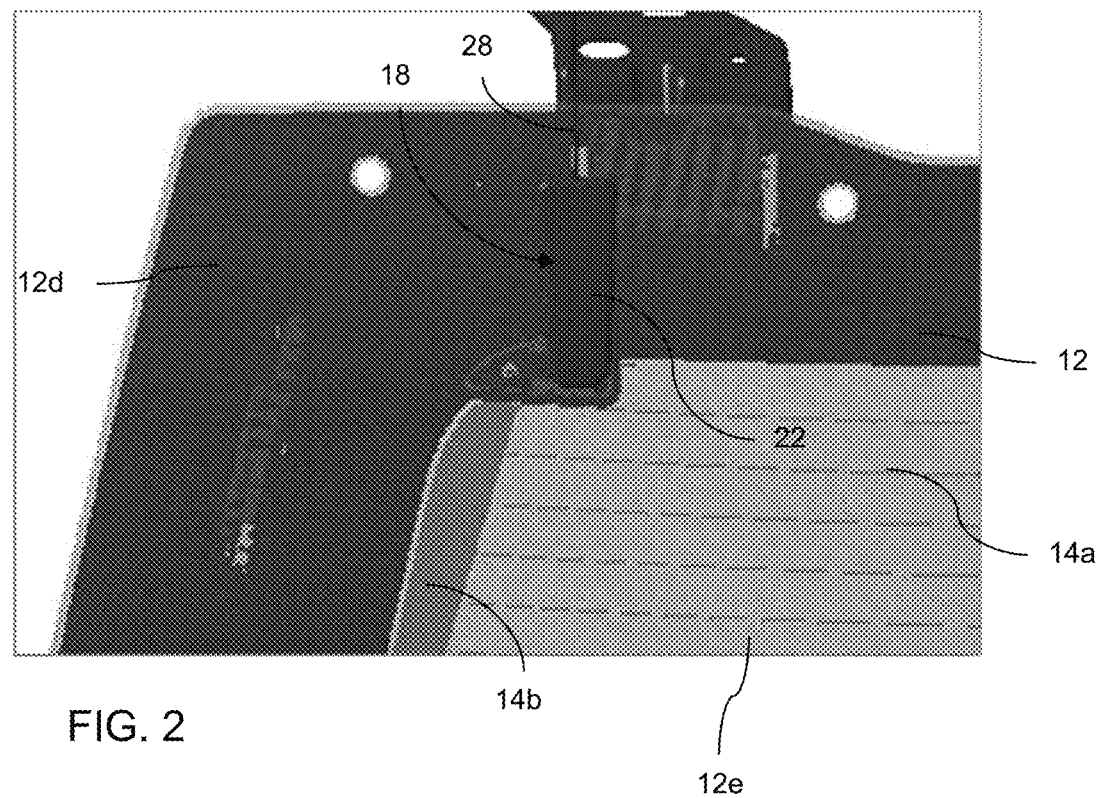
FIG. 2 is an enlarged view of the electrical connector at the exterior of the rear liftgate window assembly.

Referring now to the drawings and the illustrative embodiments depicted therein, a rear liftgate window assembly 10 for a vehicle (such as a SUV or the like) is pivotally mounted at the vehicle and is pivotable between an opened position, where the window panel is pivoted or lifted upward to open a rear portion of the vehicle, and a closed position, where the window panel is pivoted or lowered to close the rear portion of the vehicle. The rear liftgate window assembly 10 includes a window panel 12 (which may cooperate with a fixed or movable lower rear panel or door or liftgate of the vehicle to close the rear portion of the vehicle). The window assembly 10 includes a heater grid 14 disposed at the interior surface 12a of the glass window panel 12. The heater grid 14 comprises conductive traces 14a and busbars 14b that are electrically powered via electrical connectors 16 at opposite upper corner regions of the window panel 12, with each of the electrical connectors 16 having a respective electrically conductive wire extending through an aperture 12c of the glass window panel so as to be routed along an exterior side 12b of the window panel 12 and so as to not be visible to a person viewing the interior side of the window panel when the liftgate is opened or closed, as discussed below.

In the illustrated embodiment, the heater grid 14 comprises a plurality of electrically conductive horizontal traces 14a disposed at the glass window panel between vertical busbars 14b. The electrical terminals or connectors 16 are disposed at the upper ends of the respective busbars 14b and electrically connect to a connecting element 14c (FIG. 7), such as a button connector or the like, established at the respective busbar 14b. Electrical power is provided to the heater grid traces (and associated busbars) when the connectors 16 are electrically connected to vehicle wiring and powered. The electrically conductive heater grid or heating element thus is established at the interior side 12a of the window panel (such as at or on an interior surface of the window panel) and is electrically conductively connected to (or is otherwise in electrical conductive continuity with) a power source 11 of the vehicle and may be powered (such as responsive to a user actuatable input or switch or button of the vehicle or responsive to a sensor or accessory of the vehicle) to heat or defrost or defog the window panel. The electrical connectors 16 are disposed at a region of the window panel that has a non-light transmitting or darkened coating or layer or frit layer 12d so that the inner connector portion is not readily viewable from outside the window and the outer connector portion is not readily viewable from inside the window.

As shown in FIGS. 1-4, the plurality of electrically conductive traces 14a extend across the window panel between the vertical busbars 14b to provide enhanced and more uniform heating and defrosting/defogging of the window panel. The vertical busbars 14b are disposed at the outer edge regions of a transparent portion 12e of the window panel (such as at the transparent portion or optionally at the non-transparent portion adjacent to the transparent portion). The electrically conductive horizontal traces 14a are disposed substantially across the entire width of the transparent portion 12e of the window panel. The electrically conductive traces 14a are disposed parallel to and spaced apart from one another substantially equidistant from one another to provide even heating across the window panel. The electrically conductive horizontal traces 14a may also be concentrated or grouped together or otherwise arranged at desired locations of the window panel (such as at a bottom portion or the edges of the window panel) to provide differing levels of heat across the window panel. The liftgate assembly may utilize aspects of the liftgate assemblies described in U.S. Pat. No. 10,501,008 and/or U.S. Publication No. US-2018-0079379, which are hereby incorporated herein by reference in their entireties.

Figure 3:
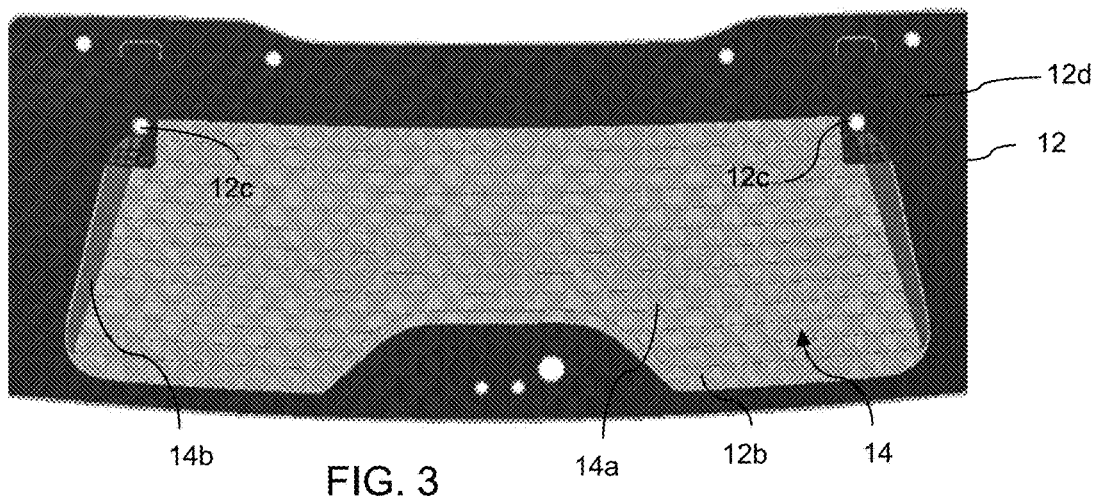
FIG. 3 is a rear view of the rear liftgate window, showing a hole for electrically connecting to the heater grid from exterior of the rear liftgate window assembly.
Figure 4:
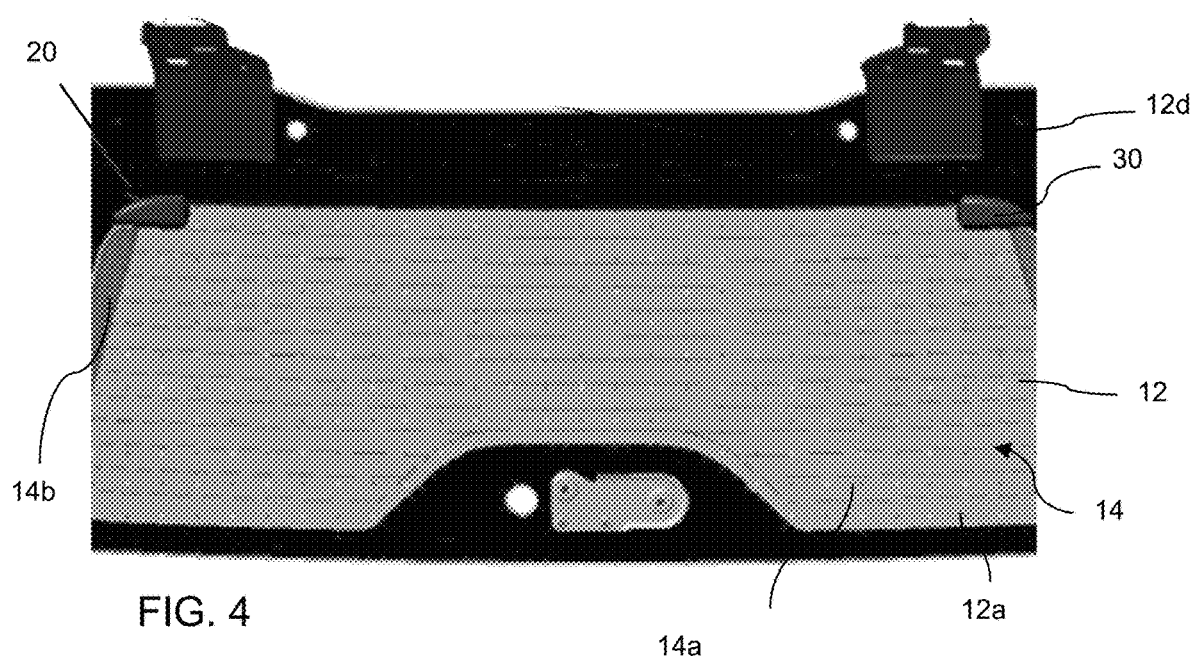
FIG. 4 is a view of the interior side of the rear liftgate window assembly, showing the electrical connectors at the interior side of the rear liftgate window assembly.
Figure 5:
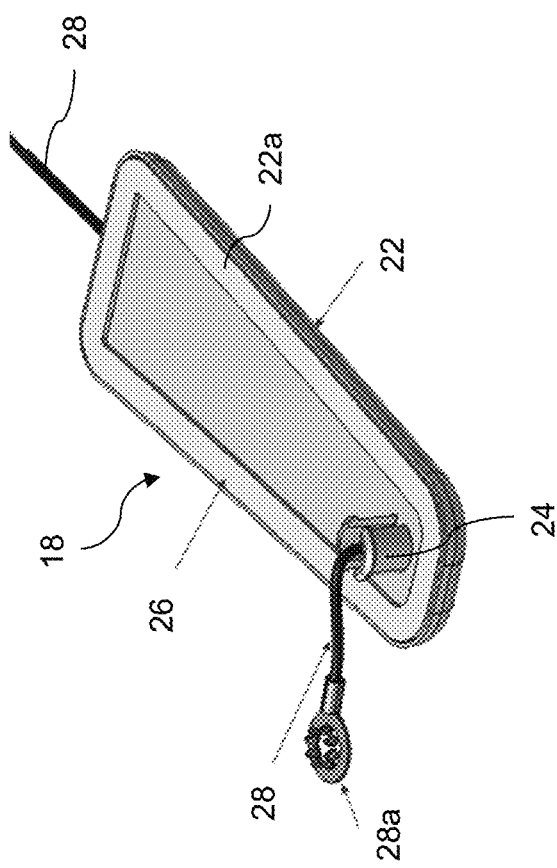
FIG. 5 is a perspective view of the exterior connector and cover, showing the electrical wire passing through the cover for electrical connection to the heater grid at the interior side of the rear liftgate window assembly.
Figure 7:
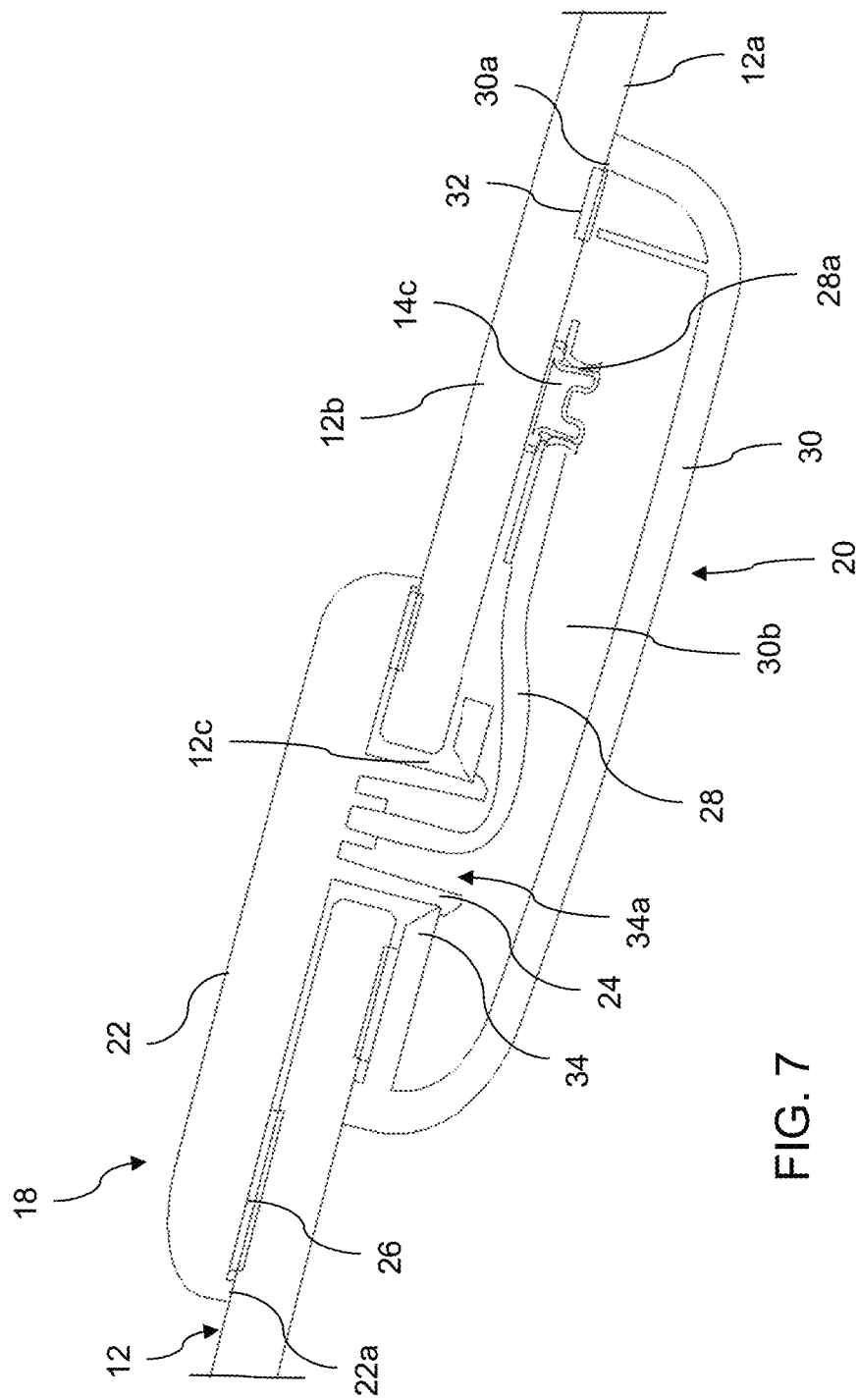
FIG. 7 is a sectional view of the interior and exterior covers as attached to one another and to the rear liftgate window.

In the illustrated embodiment, the electrical connectors 16 each comprise an outer connector portion 18 and an inner connector portion 20 that attach together and that are adhesively attached at the respective outer side and inner side of the window panel 12. As shown in FIGS. 5 and 7, the outer connector portion 18 comprises a plastic cover element 22 with a protruding snap element 24 that is configured to be inserted through the aperture or hole 12c in the window panel (FIGS. 3 and 7). An adhesive 26 (such as, for example, an adhesive tape or other suitable adhesive material or bonding material) is disposed at the window panel facing side 22a of the plastic cover element 22 of the outer connector portion for adhesively attaching the outer connector portion 18 at the outer side or surface 12b of the glass window panel 12. As shown in FIG. 5, the adhesive 26 is disposed along the periphery of the window panel facing side 22a of the plastic cover element 22 so as to, when the plastic cover element is disposed at the outer surface 12b of the window panel, provide a seal between the cover element 22 and the exterior side or surface of the window panel to limit or preclude water intrusion into the cover element and the aperture 12c in the window panel. The adhesive may be disposed at or may be part of an elastomeric or conformable gasket (e.g., a rubber or polymeric gasket) along the periphery of the window panel facing side 22a of the plastic cover element 22 so that when the adhesive is attached at the outer surface 12b of the window panel, a flexible or surface-conforming seal is formed between the cover element and the exterior surface of the window panel. The gasket may comprise a thin or low profile element to minimize protrusion of the cover element 22 from the window panel when the cover element is adhesively attached at the exterior surface 12b of the window panel.

An electrically conductive wire or element 28 is routed along and within the cover element 22 (and may be insert molded within the cover element via the plastic injection molding process that forms the cover element) and through the protruding snap element 24 and terminates at a connecting element 28a (such as, for example, a button connector) for electrically connecting to a connector or button at the upper end region of the busbar 14b.

Figure 6:
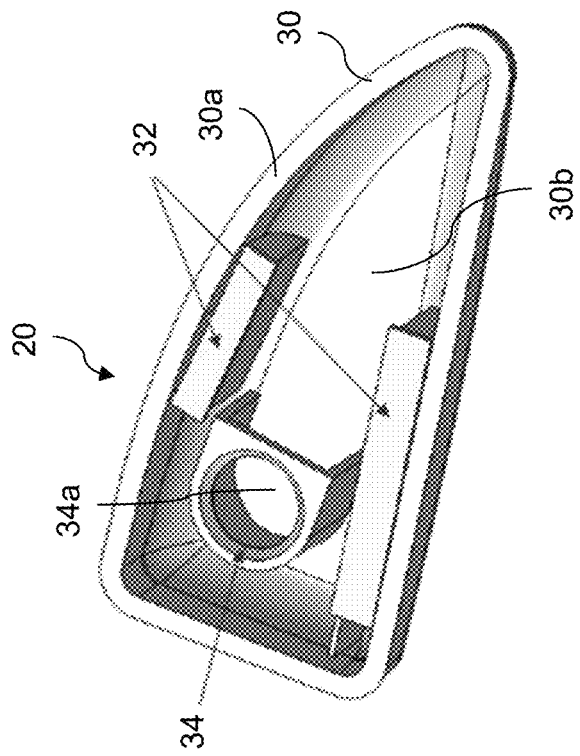
FIG. 6 is a perspective view of the interior cover for snap attaching at the exterior connector and covering and concealing the electrical connection at the interior side of the rear liftgate window assembly.

As shown in FIGS. 6 and 7, the inner connector portion 20 comprises a plastic cover element 30 having an adhesive tape 32 disposed at the window panel facing side 30a of the plastic cover element 30 of the outer connector portion for adhesively attaching the inner connector portion 20 at the inner side or surface 12a of the glass window panel 12. The cover element 30 is formed to have an inner cavity 30b to provide clearance for electrical connection of the connecting element 28a at the connector at the busbar. The cover element 30 includes a snap element 34 that is formed within the cavity and at or near the glass surface when the cover element is adhesively attached at the window panel. The snap element 34 has an aperture 34a configured to receive the protruding snap element 24 of the outer connector portion and the snap element provides for passage of the wire into the cavity for electrical connection to the busbar connector when the cover element is adhesively attached at the window panel.

As can be seen with reference to FIG. 7, the outer cover element 22 is adhesively attached at the exterior side or surface 12b of the glass window panel 12 and the inner cover element 30 is adhesively attached at the interior side or surface 12a of the glass window panel 12, with the protruding snap element 24 of the outer connector protruding through the aperture 12c and snap attaching at the snap element or surface 34 of the inner connector element. In the illustrated embodiment, the protruding element 24 has flexible arms with lips or tabs that flex inward as the element is inserted through the aperture 34a of the snap element 34 of the inner connector portion and that are biased outward so as to expand or move outward and engage the surface at and around the aperture 34a to connect or affix the outer cover element relative to the inner cover element.

Without interfering with the flexible nature of the protruding snap element 24, passage of the protruding snap element 24 through the aperture 12c, or the engagement between the protruding snap element 24 and the snap element aperture 34a and surface 34 of the inner connector element, a gasket ring may be disposed at or near the protruding snap element 24 when disposed through the aperture 12c and snap attached at the surface 34 of the inner connector element to limit or preclude water, dust or other material from entering the interior cabin of the vehicle or the inner cavity 30b of the connector element 20. For example, the gasket ring may be disposed at a base of the protruding snap element 24 against the window panel facing side 22a surface of the plastic cover element 22 with an adhesive disposed at an outer surface of the gasket ring to engage the exterior surface 12b of the window panel when the snap element 24 is pressed through the aperture 12c. The gasket ring may also be disposed at the perimeter surface of the aperture 12c through the window so as to engage the snap element 24 as the snap element is pressed through the aperture 12c to engage the snap element 34. The gasket ring may also be disposed at window panel facing side 30a surface of the snap element 34 so as to engage the interior surface 12a of the window when the cover element 30 is disposed thereat.

The wire 28 passes along the outer cover element 22 and through the passageway of the window aperture 12c and the snap element 24 and into the cavity of the inner cover element for electrical connection to the button connector 14c of the respective busbar 14b of the heater grid 14. The other end of the wire is electrically connected to a wire of a vehicle wire harness present at the upper region of the vehicle where the liftgate assembly is pivotally mounted. One of the connectors (i.e., a positive connector 16a) and its respective wire connects to a positive wire of the wire harness and the other of the connectors (i.e., a negative connector 16b) and its respective wire connects to a negative wire or ground wire of the wire harness so that electrical current flows from the positive wire of the vehicle wire harness through the positive connector to the heater grid and through the negative connector to the ground wire of the harness to power the heater grid.

Thus, the exterior cover element 22 receives an electrical wire 28 exterior of the vehicle (such as from a wire harness of the vehicle), retains the electrical wire 28 internally at the exterior cover element, and feeds the wire through a protruding snap element 24. When the exterior cover element 22 is disposed at an exterior surface 12b of a vehicular window panel 12, the electrical wire 28 is fed through an aperture 12c in the window panel to be disposed at an interior surface 12a of the window panel. The electrical wire 28 is electrically connected via a connecting element 28a to an electrical connection (such as a button connector 14c electrically connected to a busbar 14b of a heater grid 14 of the window panel) at the interior surface 12a of the window panel. The protruding snap element 24 is placed through the aperture 12c of the window panel and engages a snap element 34 of an inner connector portion 20 plastic cover element 30 attached at the interior surface 12a of the window panel.

The exterior cover element 22 is adhesively attached at the exterior surface 12b of the window panel, the plastic cover element 30 is adhesively attached at the interior surface 12a of the window panel, and the connection between the protruding snap element 24 and the receiving snap element 34 through the window aperture 12c maintains a sealed connection between the exterior cover element 22 and the plastic cover 30. The portion of the electrical wire 28 disposed within the interior portion of the vehicle (including the connection element 28a) and the connected electrical connection 14c are retained between the plastic cover element 30 and the interior surface 12a of the window panel so as to hide the electrical wire and electrical connection from view.

In the illustrated embodiment, the outside covers are approximately 34 mm wide×115 mm tall×6.5 mm thick. The wire may comprise any suitable wire or electrically conductive element, such as, for example, a 16 gauge wire having approximately a 2.7 mm diameter. The outer cover may be overmolded over and around part of the wire. The outer cover element comprises a plastic injection molded piece and is UV stable and has an exterior or outer Class A surface. In the illustrated embodiment, the inside covers are approximately 80 mm wide×35 mm tall×13 mm thick. The inner cover comprises a plastic injection molded piece and has an exterior or outer Class A surface.

Therefore, the present invention provides a rear liftgate window assembly with two molded wire harnesses that electrically connect from outside the liftgate window panel to the heater grid connectors or buttons at the inner side of the liftgate window panel through respective holes in the glass panel. The wiring is thus routed to a vehicle wire harness at the applique or spoiler above the window so the wiring is routed from the applique along and within the exterior cover element, through the hole in the glass and into the interior cover element, where electrical connection to the heater grid busbar is made. The wire connector is thus hidden from view at the interior and/or exterior side of the window panel.

Although shown and described as a button connector, the electrical connection of the connectors to the busbars may comprise any suitable electrical connection, such as a tab or spade or snap or button that is attached or soldered at the busbars (where a wire connector may receive the connection or press-fit or snap or otherwise attach to the connection). Clearly, other means for electrically connecting the electrical connectors to a wiring harness or circuitry of the vehicle may be implemented while remaining within the spirit and scope of the present invention. For example, the heater grid and conductive traces and electrical connections may utilize aspects of the systems described in U.S. Pat. Nos. 8,881,458; 8,402,695; 7,274,501; 7,184,190 and/or 7,255,451, and/or U.S. Publication No. US-2018-0079379, which are hereby incorporated herein by reference in their entireties.

In the illustrated embodiment, the liftgate window assembly comprises a separately openable window panel assembly, where the liftgate window may be opened separately from the lower rear panel or door of the vehicle. Optionally, the window assembly may remain fixed at the rear panel or door, while remaining within the spirit and scope of the present invention.

The liftgate window assembly includes hinge supports, strut supports (that may hold or attach an end of a gas-assist spring or strut at the window panel) and a latch element, which may be bonded to the inner surface of the glass window panel (such as at regions where the opaque frit layer is disposed), such that the liftgate window assembly does not require any frame portions or trim elements or the like. The hinge supports and/or strut supports and/or latch elements may be adhesively bonded at the glass window panel by utilizing aspects of the systems described in U.S. Pat. Nos. 5,853,895 and/or 5,551,197, which are hereby incorporated herein by reference in their entireties. Optionally, the liftgate window assembly (whether openable relative to the door of the vehicle or fixed at the door) may be surrounded or housed by a frame element with any combination of the hinge supports, strut supports, latch element, or other pivotable or locking mechanisms bonded or attached directly to the window assembly or attached to or housed by the frame element.

Therefore, the rear liftgate window assembly of the present invention provides a heater grid at the glass window panel that is electrically connected to one or more electrical connectors of the vehicle with the electrical connection extending or passing through the liftgate window panel from an exterior side of the window panel so that electrical connection to the heater grid is made at an interior side of the window panel and electrical connection to the vehicle wire harness is made at an exterior side of the window panel. Although shown and described as electrically connecting the vehicle wire harness to busbars of a heater grid of the rear liftgate window assembly, the electrical connection between the vehicle wire harness and electrical connectors at the in-cabin side of the window panel may be for electrically powering other electronic window accessory devices, such as illumination sources, cameras, locking mechanisms, automatic liftgate assemblies, an electrochromic element or window panel, antitheft sensors (such as shock or audio sensors that detect glass breakage) and/or the like, disposed at the in-cabin side of the window panel. Optionally, each electrical connector may provide passageway through the window panel for two (or more) electrical wires or leads for electrically connecting to two (or more) electrical connecting elements at the in-cabin side of the window panel.

Changes and modifications to the specifically described embodiments may be carried out without departing from the principles of the present invention, which is intended to be limited only by the scope of the appended claims, as interpreted according to the principles of patent law.

The invention claimed is:

1. A rear liftgate window assembly, the rear liftgate window assembly comprising:

a glass window panel configured to be pivotally mounted at a rear portion of a vehicle so as to be pivotable between a closed position, where the glass window panel is disposed at a rear opening of the vehicle and against a seal circumscribing the rear opening of the vehicle, and an opened position, where the glass window panel is raised at least partially away from the rear opening of the vehicle;

wherein the glass window panel comprises an interior side and an exterior side, and wherein the exterior side of the glass window panel is opposite the interior side of the glass window panel, and wherein, with the glass window panel pivotally mounted at the rear portion of the vehicle, the interior side is exposed at an interior of the vehicle and the exterior side is exposed exterior the vehicle;

a heater grid disposed at the interior side of the glass window panel, the heater grid comprising a plurality of electrically conductive traces established at the interior side of the glass window panel;

a pair of busbars established at the interior side of the glass window panel at opposite side regions of the electrically conductive traces of the heater grid;

wherein an aperture is established through the glass window panel at or near an upper region of each busbar, and wherein the aperture extends through the glass window panel from the interior side of the glass window panel to the exterior side of the glass window panel;

electrical connectors electrically connected at the upper regions of the busbars; and wherein a respective electrical wire is routed from the exterior side of the glass window panel and through a respective one of the electrical connectors and through the respective aperture of the glass window panel for electrical connection to the respective busbar at the interior side of the glass window panel, and wherein, with the glass window panel pivotally mounted at the rear portion of the vehicle, the respective electrical wires are electrically connected to a power source of the vehicle.

2. The rear liftgate window assembly of claim 1, wherein the electrical connectors each comprise an outer cover element and an inner cover element, and wherein the outer cover and the inner cover snap attach via a protruding element protruding through the respective aperture of the glass window panel.

3. The rear liftgate window assembly of claim 2, wherein the outer cover element is overmolded over and around at least a portion of the electrical wire.

4. The rear liftgate window assembly of claim 2, wherein the protruding element comprises a portion of the outer cover element.

5. The rear liftgate window assembly of claim 2, wherein a first adhesive element adhesively attaches the inner cover element at the interior side of the glass window panel, and wherein a second adhesive element adhesively attaches the outer cover element at the exterior side of the glass window panel.

6. The rear liftgate window assembly of claim 1, wherein the electrical connectors comprise a positive connector for electrically connecting to one of the busbars at one side of the heater grid and a negative connector for electrically connecting to the other one of the busbars at the other side of the heater grid.

7. The rear liftgate window assembly of claim 1, wherein the busbars are established at the interior side of the glass window panel and extend upward toward an upper region of the interior side of the glass window panel, and wherein the electrical connectors are electrically connected to the busbars at the upper region of the interior side of the glass window panel.

8. The rear liftgate window assembly of claim 1, wherein the electrical wires terminate at respective connecting elements for connecting to connecting elements affixed at the respective busbars at the interior side of the glass window panel.

9. The rear liftgate window assembly of claim 8, wherein the connecting elements of the electrical wires and the connecting elements at the respective busbars comprise tab-type connectors or snap-type connectors.

10. The rear liftgate window assembly of claim 1, wherein the electrical connectors are disposed at a region of the glass window panel, and wherein a non-light-transmitting coating is established at the region of the glass window panel, and wherein the non-light-transmitting coating at least partially circumscribes a transparent region of the glass window panel, and wherein the electrically conductive traces of the heater grid are established at the interior side of the glass window panel at the transparent region.

11. The rear liftgate window assembly of claim 1, wherein, with the glass window panel pivotally mounted at the rear portion of the vehicle, and with the glass window panel in the opened position, the glass window panel is in a horizontal orientation.

12. A rear liftgate window assembly, the rear liftgate window assembly comprising:

a glass window panel configured to be pivotally mounted at a rear portion of a vehicle so as to be pivotable between a closed position, where the glass window panel is disposed at a rear opening of the vehicle and against a seal circumscribing the rear opening of the vehicle, and an opened position, where the glass window panel is raised at least partially away from the rear opening of the vehicle;

wherein the glass window panel comprises an interior side and an exterior side, and wherein the exterior side of the glass window panel is opposite the interior side of the glass window panel, and wherein, with the glass window panel pivotally mounted at the rear portion of the vehicle, the interior side is exposed at an interior of the vehicle and the exterior side is exposed exterior the vehicle;

a heater grid disposed at the interior side of the glass window panel, the heater grid comprising a plurality of electrically conductive traces established at the interior side of the glass window panel;

a pair of busbars established at the interior side of the glass window panel and extending upward toward an upper region of the interior side of the glass window panel at opposite side regions of the electrically conductive traces of the heater grid;

wherein an aperture is established through the glass window panel at or near an upper region of each busbar, and wherein the aperture extends through the glass window panel from the interior side of the glass window panel to the exterior side of the glass window panel;

electrical connectors electrically connected to respective connecting elements affixed at the upper regions of the respective busbars, each electrical connector comprising (i) an outer cover element adhesively attached at an exterior side of the glass window panel via a first adhesive element and (ii) an inner cover element adhesively attached at the interior side of the glass window panel via a second adhesive element;

electrical wires terminating at respective connecting elements for connecting to the connecting elements of the busbars; and wherein each respective electrical wire is routed from the exterior side of the glass window panel and through a respective one of the electrical connectors and through the respective aperture of the glass window panel for electrical connection to the respective connecting element of the respective busbar, and wherein, with the glass window panel pivotally mounted at the rear portion of the vehicle, the respective electrical wires are electrically connected to a power source of the vehicle.

13. The rear liftgate window assembly of claim 12, wherein the outer cover element and the inner cover element of each electrical connector snap attach via a protruding element protruding through the respective aperture of the glass window panel.

14. The rear liftgate window assembly of claim 13, wherein the protruding element comprises a portion of the outer cover element.

15. The rear liftgate window assembly of claim 12, wherein the outer cover element is overmolded over and around at least a portion of the electrical wire.

16. The rear liftgate window assembly of claim 12, wherein the electrical connectors comprise a positive connector for electrically connecting to one of the busbars at one side of the heater grid and a negative connector for electrically connecting to the other one of the busbars at the other side of the heater grid.

17. The rear liftgate window assembly of claim 12, wherein the connecting elements of the electrical wires and the connecting elements at the respective busbars comprise tab-type connectors or snap-type connectors.

18. The rear liftgate window assembly of claim 12, wherein, with the glass window panel pivotally mounted at the rear portion of the vehicle, and with the glass window panel in the opened position, the glass window panel is in a horizontal orientation.

* * * * *